(12) United States Patent
Makwinski

(10) Patent No.: US 12,358,340 B2
(45) Date of Patent: Jul. 15, 2025

(54) PROACTIVE ADJUSTMENT OF TRANSPORT REFRIGERATION UNITS

(71) Applicant: Carrier Corporation, Palm Beach Gardens, FL (US)

(72) Inventor: Mark Makwinski, Cromwell, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 130 days.

(21) Appl. No.: 18/175,637

(22) Filed: Feb. 28, 2023

(65) Prior Publication Data
US 2023/0278392 A1  Sep. 7, 2023

Related U.S. Application Data

(60) Provisional application No. 63/315,168, filed on Mar. 1, 2022.

(51) Int. Cl.
*B60H 1/00* (2006.01)
*B60P 3/20* (2006.01)

(52) U.S. Cl.
CPC ..... *B60H 1/00428* (2013.01); *B60H 1/00014* (2013.01); *B60H 1/00385* (2013.01); *B60H 1/00492* (2013.01); *B60H 1/00771* (2013.01); *B60P 3/20* (2013.01)

(58) Field of Classification Search
CPC ............ B60H 1/00428; B60H 1/00014; B60H 1/00385; B60H 1/00771; B60P 3/20
See application file for complete search history.

(56) References Cited

U.S. PATENT DOCUMENTS

| 8,153,314 B2 * | 4/2012 | Umayahara ............. B60L 58/30 |
| | | 429/429 |
| 2015/0316301 A1 | 11/2015 | Kolda et al. |
| 2019/0202380 A1 * | 7/2019 | Schumacher ............ B60Q 9/00 |
| 2019/0277647 A1 | 9/2019 | Adetola et al. |

FOREIGN PATENT DOCUMENTS

| EP | 3647087 A1 | 9/2019 |
| EP | 3674115 A1 | 7/2020 |
| EP | 3677459 A1 | 7/2020 |
| EP | 3819145 A1 | 7/2020 |
| WO | 2020072265 A1 | 7/2020 |
| WO | 2020142066 A1 | 7/2020 |
| WO | 2021244832 A1 | 7/2020 |

OTHER PUBLICATIONS

European Search Report for Application No. 23159222.1, Issued Aug. 2, 2023, 8 Pages.

* cited by examiner

*Primary Examiner* — Marc E Norman
(74) *Attorney, Agent, or Firm* — CANTOR COLBURN LLP

(57) ABSTRACT

A method of operating a transport refrigeration system including: detecting, using one or more sensors, operational data of a transport refrigeration unit and a power supply system configured to provide electricity to the transport refrigeration unit; receiving external data; determining a recommended adjustment command based on the operational data and the external data; and adjusting an operation of at least one of the transport refrigeration unit or the power supply system based on the recommended adjustment command.

19 Claims, 3 Drawing Sheets

PROACTIVE ADJUSTMENT OF TRANSPORT REFRIGERATION UNITS

CROSS-REFERENCE TO RELATED APPLICATIONS

This applications claims the benefit of U.S. Provisional Application No. 63/315,168, filed Mar. 1, 2022, all of which are incorporated herein by reference in their entirety.

BACKGROUND

The embodiments herein generally relate to refrigeration control systems and more specifically, to proactive adjustment of transport refrigeration unit (TRU) setting to optimize system performance and efficiency.

Refrigerated vehicles and trailers are commonly used to transport perishable goods. A transport refrigeration unit is commonly mounted to the vehicles or to the trailer in operative association with a cargo space defined within the vehicles or trailer for maintaining a controlled temperature environment within the cargo space.

Conventionally, transport refrigeration units used in connection with refrigerated vehicles and refrigerated trailers include a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

On many commercially available transport refrigeration units the compressor, and typically other components of the transport refrigeration unit, is powered during transit by a prime mover, either through a direct mechanical coupling or a belt drive. Alternatively, the transport refrigeration unit may be electrically powered (e.g., using an alternating (AC) synchronous generator that generates AC power). The generated AC power is typically used to power an electric motor for driving the refrigerant compressor, and other components of the transport refrigeration unit. In a different electrically powered transport refrigeration unit, the AC generator may be replaced with a battery pack to provide power to the loads. The battery pack is a finite source of power that must be closely monitored to preserve energy. Accordingly, additional methods of conserving battery energy are desired.

BRIEF DESCRIPTION

According to one embodiment, a method of operating a transport refrigeration system is provided. The method including: detecting, using one or more sensors, operational data of a transport refrigeration unit and a power supply system configured to provide electricity to the transport refrigeration unit; receiving external data; determining a recommended adjustment command based on the operational data and the external data; and adjusting an operation of at least one of the transport refrigeration unit or the power supply system based on the recommended adjustment command.

In addition to one or more of the features described above, or as an alternative, further embodiments of may include that the operation is automatically adjusted based on the recommended adjustment command by at least one of a controller of the transport refrigeration unit or a power management module of the power supply system.

In addition to one or more of the features described above, or as an alternative, further embodiments of may include transmitting the recommended adjustment command to a computing device of an individual, wherein the individual can adjust the operation based on the recommended adjustment command.

In addition to one or more of the features described above, or as an alternative, further embodiments of may include that the power supply system comprises a fuel cell, wherein the external data comprises a location of a fuel station on a present route, and wherein adjusting operation of at least one of the transport refrigeration unit or the power supply system based on the recommended adjustment command further comprises: increasing fuel consumption by the fuel cell, electricity generation by the fuel cell, and electricity consumption by the transport refrigeration unit from the fuel cell to increase cooling of a transport container by the transport refrigeration unit generating conditioned air prior to the location of the fuel station on the present route.

In addition to one or more of the features described above, or as an alternative, further embodiments of may include that the power supply system comprises an energy storage device, wherein the external data comprises a location of a charging station on a present route, and wherein adjusting operation of at least one of the transport refrigeration unit or the power supply system based on the recommended adjustment command further comprises: adjusting electricity consumption by the transport refrigeration unit from the energy storage device to adjust cooling of a transport container by the transport refrigeration unit air generating conditioned air prior to the location of the charging station on the present route.

In addition to one or more of the features described above, or as an alternative, further embodiments of may include that the power supply system comprises an energy storage device and an axle generator or a hub generator, wherein the external data comprises a location of a downhill descent on a present route, and wherein adjusting operation of at least one of the transport refrigeration unit or the power supply system based on the recommended adjustment command further comprises: increasing electricity consumption by the transport refrigeration unit from the energy storage device to increase cooling of a transport container by the transport refrigeration unit generating conditioned air prior to the location of the downhill descent on the present route.

In addition to one or more of the features described above, or as an alternative, further embodiments of may include that the power supply system comprises an energy storage device and an axle generator or a hub generator, wherein the external data comprises a location of a braking area on a present route, and wherein adjusting operation of at least one of the transport refrigeration unit or the power supply system based on the recommended adjustment command further comprises: increasing electricity consumption by the transport refrigeration unit from the energy storage device to increase cooling of a transport container by the transport refrigeration unit generating conditioned air prior to the location of the braking area on the present route.

In addition to one or more of the features described above, or as an alternative, further embodiments of may include that the power supply system comprises a fuel cell, wherein the external data comprises a location of a fuel station on a present route, and wherein adjusting operation of at least one of the transport refrigeration unit or the power supply system based on the recommended adjustment command further comprises: increasing fuel consumption by the fuel cell, electricity generation by the fuel cell, and electricity consumption by a thermal storage system from the fuel cell to increase cooling of a transport container by charging the thermal storage system prior to the location of the fuel station on the present route.

In addition to one or more of the features described above, or as an alternative, further embodiments of may include that the power supply system comprises an energy storage device, wherein the external data comprises a location of a charging station on a present route, and wherein adjusting operation of at least one of the transport refrigeration unit or the power supply system based on the recommended adjustment command further comprises: increasing electricity consumption by a thermal storage system from the energy storage device to increase cooling of a transport container by charging the thermal storage system prior to the location of the charging station on the present route.

In addition to one or more of the features described above, or as an alternative, further embodiments of may include that the power supply system comprises an energy storage device and an axle generator or a hub generator, wherein the external data comprises a location of a downhill descent on a present route, and wherein adjusting operation of at least one of the transport refrigeration unit or the power supply system based on the recommended adjustment command further comprises: increasing electricity consumption by a thermal storage system from the energy storage device to increase cooling of a transport container by charging the thermal storage system prior to the location of the downhill descent on the present route.

In addition to one or more of the features described above, or as an alternative, further embodiments of may include that the power supply system comprises an energy storage device and an axle generator or a hub generator, wherein the external data comprises a location of a braking area on a present route, and wherein adjusting operation of at least one of the transport refrigeration unit or the power supply system based on the recommended adjustment command further comprises: increasing electricity consumption by a thermal storage system from the energy storage device to increase cooling of a transport container by charging the thermal storage system] prior to the location of the braking area on the present route.

In addition to one or more of the features described above, or as an alternative, further embodiments of may include that the external data comprises a location on a present route where a door will be opened to a transport container operably connected to the transport refrigeration unit, and wherein adjusting operation of at least one of the transport refrigeration unit or the power supply system based on the recommended adjustment command further comprises: increasing electricity consumption by the transport refrigeration unit from the power supply system to increase cooling of a transport container by the transport refrigeration unit generating conditioned air prior to the location on the present route where the door will be opened to the transport container.

In addition to one or more of the features described above, or as an alternative, further embodiments of may include that the external data comprises a future weather event on a present route that will be experienced by the transport refrigeration unit, and wherein adjusting operation of at least one of the transport refrigeration unit or the power supply system based on the recommended adjustment command further comprises: adjusting electricity consumption by the transport refrigeration unit from the power supply system to adjusting cooling of a transport container by the transport refrigeration unit generating conditioned air prior to the future weather event on the present route.

In addition to one or more of the features described above, or as an alternative, further embodiments of may include that the external data comprises a location on a present route where a door will be opened to a transport container operably connected to the transport refrigeration unit, and wherein adjusting operation of at least one of the transport refrigeration unit or the power supply system based on the recommended adjustment command further comprises: increasing electricity consumption by a thermal storage system from the power supply system to increase cooling of the transport container the thermal storage system generating ice prior to the location on the present route where the door will be opened to the transport container.

In addition to one or more of the features described above, or as an alternative, further embodiments of may include that the external data comprises a future weather event on a present route that will be experienced by the transport refrigeration unit, and wherein adjusting operation of at least one of the transport refrigeration unit or the power supply system based on the recommended adjustment command further comprises: increasing electricity consumption by a thermal storage system from the power supply system to increase cooling of the transport container by charging the thermal storage system prior to the future weather event on the present route.

In addition to one or more of the features described above, or as an alternative, further embodiments of may include that the recommended adjustment command is determined using at least one of artificial intelligence or machine learning.

In addition to one or more of the features described above, or as an alternative, further embodiments of may include that the external data is data about at least one of: a route of the transport refrigeration unit and the power supply system; a current condition of a vehicle, the refrigeration unit, or a perishable good; or a predicted condition of the vehicle, the refrigeration unit, or the perishable good.

In addition to one or more of the features described above, or as an alternative, further embodiments of may include rerouting the transportation refrigeration unit based on the at least one of the operational data and the external data.

According to another embodiment, a transport refrigeration system comprising: a transport refrigeration unit configured to provide conditioned air to a refrigerated cargo space of a transport container; a power supply system configured to provide electricity to the transport refrigeration unit; one or more sensors configured to detect operational data of the transport refrigeration unit and the power supply system; and an analytics module configured received external data and determine a recommended adjustment command based on the operational data and the external data, wherein an operation of at least one of the transport refrigeration unit or the power supply system is adjusted based on the recommended adjustment command.

According to another embodiment, a computer program product tangibly embodied on a non-transitory computer readable medium, the computer program product including instructions that, when executed by a processor, cause the processor to perform operations comprising: detecting, using one or more sensors, operational data of a transport refrigeration unit and a power supply system configured to provide electricity to the transport refrigeration unit; receiving external data; determining a recommended adjustment command based on the operational data and the external data; and adjusting an operation of at least one of the transport refrigeration unit or the power supply system based on the recommended adjustment command.

Technical effects of embodiments of the present disclosure include adjusting operation of a transport refrigeration unit and/or a power supply of the transport refrigeration unit based on external data and operational data.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Embodiments disclosed herein preemptively adjusting operation of a transport refrigeration unit and/or a power supply for the transport refrigeration unit to account for future conditions experienced along a route.

Figure 1:
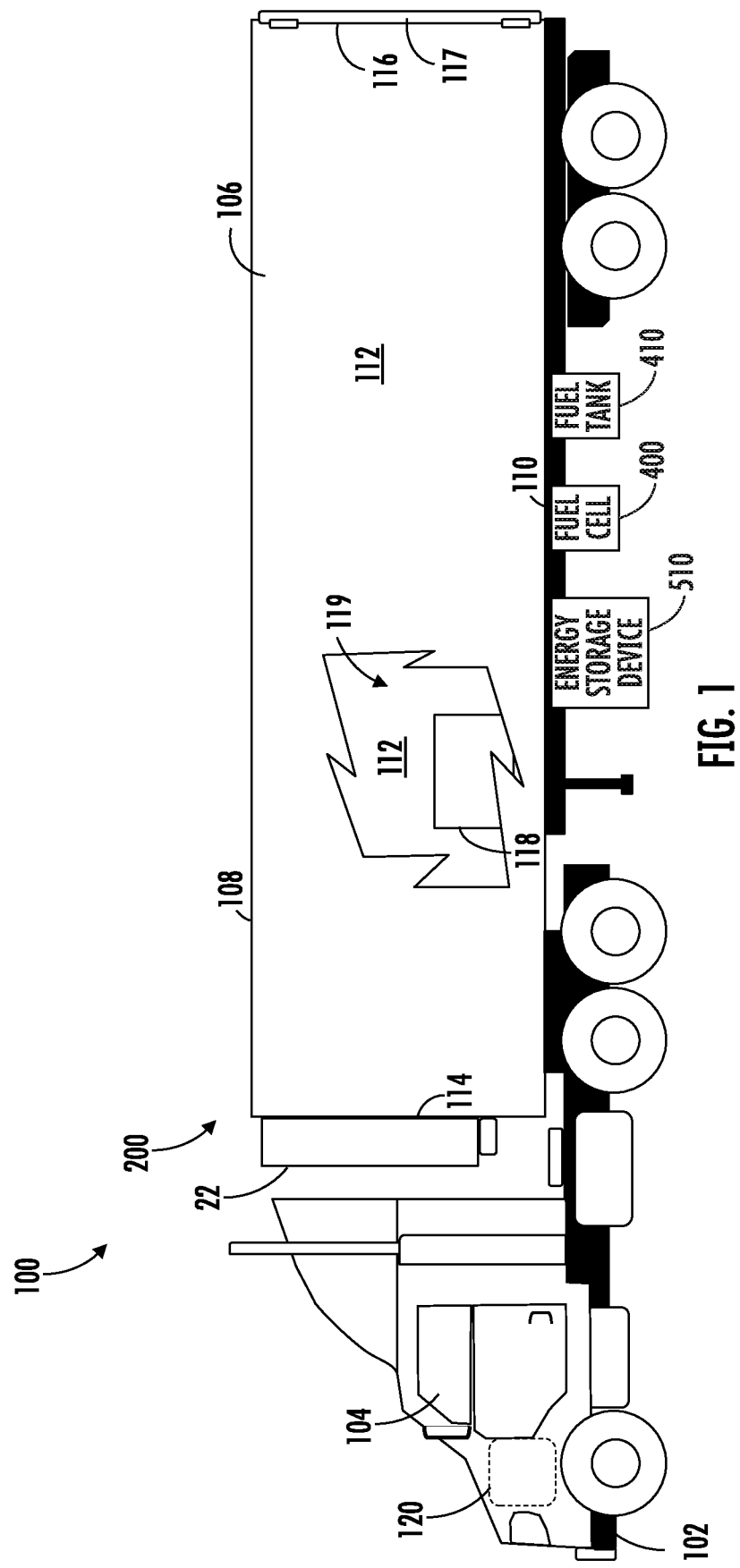
FIG. 1 is a schematic illustration of an exemplary transport refrigeration system, according to an embodiment of the present disclosure.

Referring now to FIG. 1, a schematic view of a transport refrigeration system 200 is illustrated, according to an embodiment of the present disclosure. The transport refrigeration system 200 is being illustrated as a trailer system 100, as seen in FIG. 1. The trailer system 100 includes a vehicle 102 integrally connected to a transport container 106. The vehicle 102 includes an operator's compartment or cab 104 and a propulsion motor 120 which acts as the drive system of the trailer system 100. The propulsion motor 120 is configured to power the vehicle 102. The energy source that powers the propulsion motor 120 may be at least one of compressed natural gas, liquefied natural gas, gasoline, electricity, diesel, hydrogen, electricity from a fuel cell, a electricity from a hydrogen fueled proton exchange membrane (PEM) fuel cell, electricity from a battery, electricity from a generator, or any combination thereof. The propulsion motor 120 may be an electric motor or a hybrid motor (e.g., a combustion engine and an electric motor). The transport container 106 is coupled to the vehicle 102. The transport container 106 may be removably coupled to the vehicle 102. The transport container 106 is a refrigerated trailer and includes a top wall 108, a directly opposed bottom wall 110, opposed side walls 112, and a front wall 114, with the front wall 114 being closest to the vehicle 102. The transport container 106 further includes a door or doors 117 at a rear wall 116, opposite the front wall 114. The walls of the transport container 106 define a refrigerated cargo space 119. It is appreciated by those of skill in the art that embodiments described herein may be applied to a tractor-trailer refrigerated system or non-trailer refrigeration such as, for example a rigid truck, a truck having refrigerated compartment.

Typically, transport refrigeration systems 200 are used to transport and distribute perishable goods and environmentally sensitive goods (herein referred to as perishable goods 118). The perishable goods 118 may include but are not limited to fruits, vegetables, grains, beans, nuts, eggs, dairy, seed, flowers, meat, poultry, fish, ice, blood, pharmaceuticals, or any other suitable cargo requiring temperature controlled transport. The transport refrigeration unit 22 is in operative association with the refrigerated cargo space 119 and is configured to provide conditioned air to the transport container 106.

The transport refrigeration unit 22 is powered by a fuel cell 400 and/or an energy storage device 510. The fuel cell 400, associated fuel tanks 410, and energy storage device 510 may be attached to the trailer system 100. The fuel cell 400, associated fuel tanks 410, and energy storage device 510 may be attached to a bottom of the trailer system 100.

Figure 2:
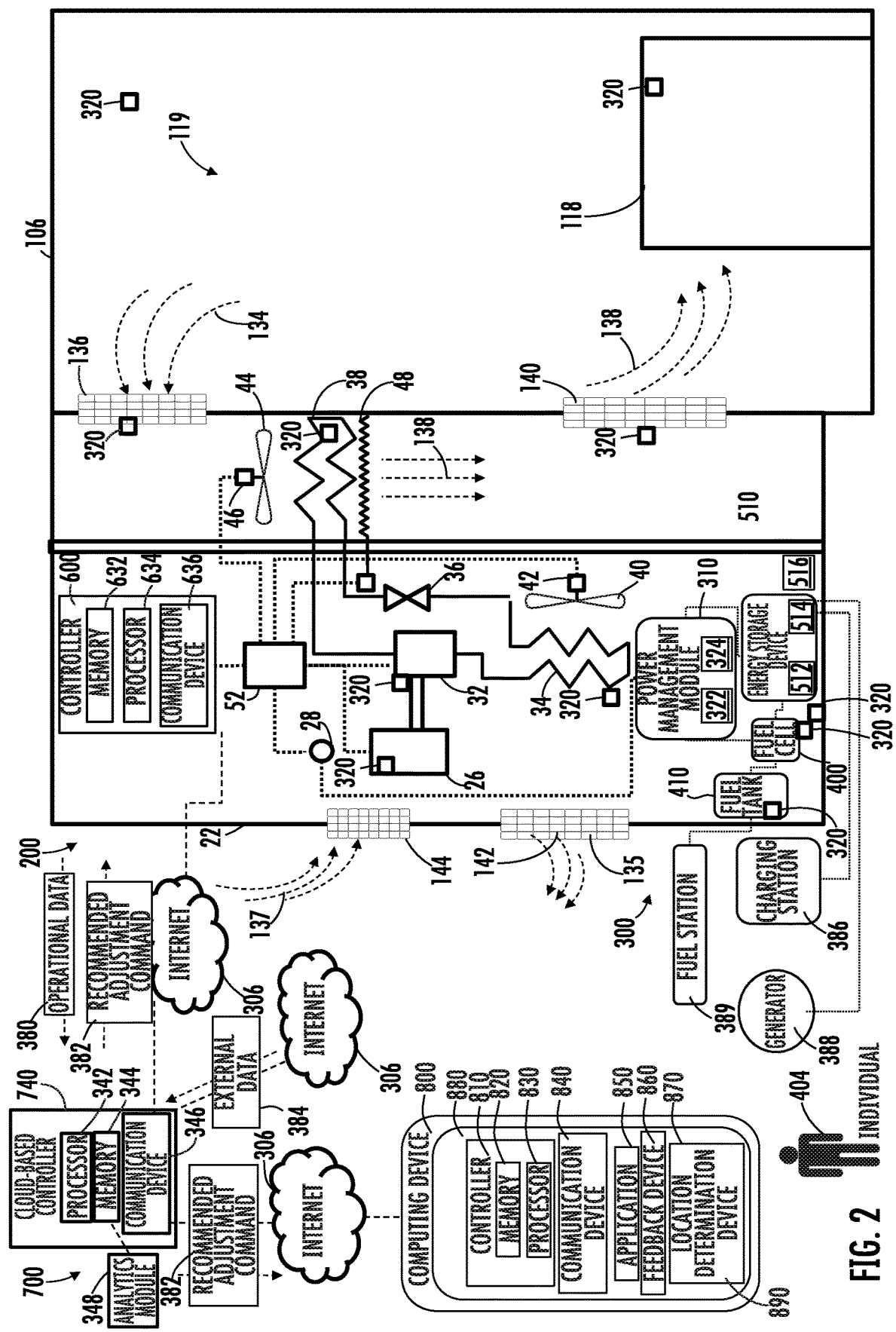
FIG. 2 is an enlarged schematic illustration of an exemplary transport refrigeration unit of the transport refrigeration system of FIG. 1, according to an embodiment of the present disclosure.

Referring now to FIG. 2, with continued reference to FIG. 1, an enlarged schematic view of the transport refrigeration system 200 is illustrated, according to an embodiment of the present disclosure. The transport refrigeration system 200 includes a transport refrigeration unit 22, a refrigerant compression device 32, an electric motor 26 for driving the refrigerant compression device 32, a controller 600, a refrigerant heat rejection heat exchanger 34, an expansion device 36, and a refrigerant heat absorption heat exchanger 38 connected in refrigerant flow communication in a closed loop refrigerant circuit and arranged in a conventional refrigeration cycle. The transport refrigeration unit 22 functions, under the control of the controller 600, to establish and regulate a desired environmental parameters, such as, for example temperature, pressure, humidity, carbon dioxide, ethylene, ozone, light exposure, vibration exposure, and other conditions in the refrigerated cargo space 119, as known to one of ordinary skill in the art. In an embodiment, the transport refrigeration unit 22 is capable of providing a desired temperature and humidity range.

The transport refrigeration unit 22 also includes one or more fans 40 associated with the refrigerant heat rejection heat exchanger 34 and driven by fan motor(s) 42 and one or more fans 44 associated with the refrigerant heat absorption heat exchanger 38 and driven by fan motor(s) 46. The transport refrigeration unit 22 may also include a heater 48 associated with the refrigerant heat absorption heat exchanger 38. In an embodiment, the heater 48 may be an electric resistance heater. It is to be understood that other components (not shown) may be incorporated into the refrigerant circuit as desired, including for example, but not limited to, a suction modulation valve, a receiver, a filter/dryer, an economizer circuit.

The refrigerant heat rejection heat exchanger 34 may, for example, comprise one or more refrigerant conveying coiled tubes or one or more tube banks formed of a plurality of refrigerant conveying tubes across flow path to the heat outlet 142. The fan(s) 40 are operative to pass air, typically ambient air, across the tubes of the refrigerant heat rejection heat exchanger 34 to cool refrigerant vapor passing through the tubes. The refrigerant heat rejection heat exchanger 34 may operate either as a refrigerant condenser, such as if the transport refrigeration unit 22 is operating in a subcritical refrigerant cycle or as a refrigerant gas cooler, such as if the transport refrigeration unit 22 is operating in a transcritical cycle.

The refrigerant heat absorption heat exchanger 38 may, for example, also comprise one or more refrigerant conveying coiled tubes or one or more tube banks formed of a plurality of refrigerant conveying tubes extending across flow path from a return air intake 136. The fan(s) 44 are operative to pass air drawn from the refrigerated cargo space 119 across the tubes of the refrigerant heat absorption heat exchanger 38 to heat and evaporate refrigerant liquid passing through the tubes and cool the air. The air cooled in traversing the refrigerant heat absorption heat exchanger 38 is supplied back to the refrigerated cargo space 119 through a refrigeration unit outlet 140. It is to be understood that the term "air" when used herein with reference to the atmosphere within the cargo box includes mixtures of air with other gases, such as for example, but not limited to, nitrogen or carbon dioxide, sometimes introduced into a refrigerated cargo box for transport of perishable produce.

Airflow is circulated into and through the refrigerated cargo space 119 of the transport container 106 by means of the transport refrigeration unit 22. A return air 134 flows into the transport refrigeration unit 22 from the refrigerated cargo space 119 through the transport refrigeration unit return air intake 136, and across the refrigerant heat absorption heat exchanger 38 via the fan 44, thus conditioning the return air 134 to a selected or predetermined temperature. The return air 134, now referred to as conditioned air 138, is supplied into the refrigerated cargo space 119 of the transport container 106 through the transport refrigeration unit outlet 140. Heat 135 is removed from the refrigerant heat rejection heat exchanger 34 through the heat outlet 142. The transport refrigeration unit 22 may contain an external air inlet 144, as shown in FIG. 2, to aid in the removal of heat 135 from the refrigerant heat rejection heat exchanger 34 by pulling in external air 137. The conditioned air 138 may cool the perishable goods 118 in the refrigerated cargo space 119 of the transport container 106. It is to be appreciated that the transport refrigeration unit 22 can further be operated in reverse to warm the transport container 106 when, for example, the outside temperature is very low. In the illustrated embodiment, the return air intake 136, the transport refrigeration unit outlet 140, the heat outlet 142, and the external air inlet 144 are configured as grilles to help prevent foreign objects from entering the transport refrigeration unit 22.

The transport refrigeration system 200 also includes a controller 600 configured for controlling the operation of the transport refrigeration system 200 including, but not limited to, the operation of various components of the refrigerant unit 22 to provide and maintain a desired thermal environment within the refrigerated cargo space 119. The controller 600 may also be able to selectively operate the electric motor 26. The controller 600 may be an electronic controller including a processor 632 and an associated memory 634 comprising computer-executable instructions that, when executed by the processor 632, cause the processor 632 to perform various operations. The processor 632 may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 634 may be a storage device such as, for example, a random access memory (RAM), read only memory (ROM), or other electronic, optical, magnetic or any other computer readable medium.

The fuel cell 400 may include an anode electrode and a cathode electrode separated by an electrolyte (not shown for simplicity). A reducing fluid such as hydrogen is supplied to the anode electrode, and an oxidant such as oxygen or air is supplied to the cathode electrode. In a cell utilizing a proton exchange membrane ("PEM") as the electrolyte, the hydrogen electrochemically reacts at a catalyst surface of the anode electrode to produce hydrogen ions and electrons. The electrons are conducted to an external load circuit (e.g., the transport refrigeration unit 22 or energy storage device 510) and then returned to the cathode electrode, while the hydrogen ions transfer through the electrolyte to the cathode electrode, where they react with the oxidant and electrons to produce water and release thermal energy. A fuel tank 410 is configured to store and provide the reducing fluid to the fuel cell 400. In an embodiment, the reducing fluid is hydrogen. The fuel tank 410 may be refilled with fuel at a fuel station 389.

In one embodiment, the fuel cell 400 and fuel tank 410 may be located inside the transport refrigeration unit 22, as shown in FIG. 2. In another embodiment, the fuel cell 400 and fuel tank 410 may be located outside of the transport refrigeration unit 22.

In one embodiment, the energy storage device 510 may be located within the transport refrigeration unit 22, as shown in FIG. 2. In another embodiment, the energy storage device 510 may be located outside of the transport refrigeration unit 22. The fuel cell 400 may power the transport refrigeration unit 22 directly or may provide electricity to the energy storage device 510, which then provides power to the transport refrigeration unit 22.

The energy storage device 510 may include a battery system 512, a capacitor 514, and/or any other electricity storage system known to one of skill in the art. The battery system 512 may comprise, chemical batteries, lithium-ion batteries, solid state batteries, flow batteries, or any other type of battery known to one of skill in the art. The battery system 512 may employ multiple batteries organized into battery banks. The capacitor 514 may be an electrolytic capacitor, a mica capacitor, a paper capacitor a film capacitor, a non-polarized capacitor, a ceramic capacitor, or any type of capacitor known to one of skill in the art.

The energy storage device 510 may be charged by a stationary charging station 386 such as, for example a three-phase 460 Vac (60 Hz) or 400 Vac (50 Hz) power outlet. The charging station 386 may provide single phase (e.g., level 2 charging capability) or three phase AC power to the energy storage device 510. It is understood that the charging station 386 may have any phase charging and embodiments disclosed herein are not limited to single phase or three phase AC power. In an embodiment, the charging station may be a high voltage DC power, such as, for example, 500 VDC. One function of the charging station 386 is to balance the cell voltage of individual cells of the battery system at some regular cadence.

A thermal storage system 516 may be present to sink electrical energy into in order to cool the transport container 106. The thermal storage system 516 may utilize a phase change material, heat transfer fluids, or thermochemical reactions to provide cooling to the transport container 106. For example, the thermal storage system 516 may utilize electricity to change the phase change material from one phase to another phase to cool the transport container 106. The thermal storage system 516 may be an ice generation system to create ice to cool the transport container 106. The thermal storage system 516 may be an ice generation system to create ice to cool the transport container 106. The ice generation system may generate ice when electricity is available or plentiful to provide lasting cooling for the transport container 106 to conserve electricity later by reducing use of the compression device 32 for cooling.

The transport refrigeration unit 22 has a plurality of electrical power demand loads on the energy storage device 510, including, but not limited to, the electric motor 26 for the compression device 32, the fan motor 42 for the fan 40 associated with the refrigerant heat rejection heat exchanger 34, and the fan motor 46 for the fan 44 associated with the refrigerant heat absorption heat exchanger 38. As each of the fan motors 42, 46 and the electric motor 26 may be an AC motor or a DC motor, it is to be understood that various power converters 52, such as AC to DC rectifiers, DC to AC inverters, AC to AC voltage/frequency converters, and DC to DC voltage converters, may be employed in connection with or without the energy storage device 510 as appropriate. In the depicted embodiment, the heater 48 also constitutes an electrical power demand load. The electric resistance heater 48 may be selectively operated by the controller 600 whenever a control temperature within the temperature controlled cargo box drops below a preset lower temperature limit, which may occur in a cold ambient environment. In such an event the controller 600 would activate the heater 48 to heat air circulated over the heater 48 by the fan(s) 44 associated with the refrigerant heat absorption heat exchanger 38. The heater 48 may also be used to de-ice the return air intake 136. Additionally, the electric motor 26 being used to power the refrigerant compression device 32 constitutes a demand load. The refrigerant compression device 32 may comprise a single-stage or multiple-stage compressor such as, for example, a reciprocating compressor or a scroll compressor. The transport refrigeration system 200 may also include a voltage sensor 28 to sense the voltage coming into the transport refrigeration unit 22.

The power demand loads of the transport refrigeration unit 22 may be managed and fulfilled by a power supply system 300. The power supply system 300 may be configured to provide electricity to power the transport refrigeration system 22. The power supply system may store and/or generate electricity. The power supply system 300 may include the fuel cell 400, the fuel tank 410, the energy storage device 510, and the power management module 310. It is understood that the embodiment disclosed herein may be applicable to other power supply systems that may or may not include fuel cells. Some examples of other power supply systems may include a fossil fuel generator, a generator 388 (e.g., a hub generator, an axle generator), a solar panel, a battery system, the propulsion motor 120 of the vehicle 102, or any other power supply system known to one of skill in the art. The generator 388 may be a hub generator or a wheel generator operably connect to a wheel or axle of the transport container 106 that is configured to generator electricity during the slowing of the vehicle 102 or the downward descent of the vehicle 102. The generator 388 may serve as part of the power supply system 300 and assist in generating supplemental electricity for the power supply system 300 as required.

The power management module 310 may be an electronic controller including a processor 324 and an associated memory 322 comprising computer-executable instructions (i.e., computer program product) that, when executed by the processor 324, cause the processor 324 to perform various operations. The processor 324 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 322 may be but is not limited to a random access memory (RAM), read only memory (ROM), or other electronic, optical, magnetic or any other computer readable medium. While the power management module 310 is being illustrated and described herein as a separate electronic controller the embodiments described herein are applicable to the power management module 310 being incorporated as software within the controller 600 of the transport refrigeration unit 22 or a controller of the fuel cell 400.

FIG. 2 also illustrates a transportation refrigeration unit performance adjustment system 700, according to an embodiment of the present disclosure. It should be appreciated that, although particular systems are separately defined in the schematic block diagrams, each or any of the systems may be otherwise combined or separated via hardware and/or software.

The transportation refrigeration unit performance adjustment system 700, as illustrated, may include the cloud-based controller 740, the controller 600 of the transport refrigeration unit 22, one or more sensors 320, and a computer application 850 installed or accessible on a computing device 800. The one or more sensors 320 that may be distributed throughout the transport refrigeration unit 22 and the refrigerated cargo space 119. For example, the sensors 320 may be located on in the transport container 106, proximate or on the perishable goods 118, proximate or on the return air intake 136, proximate or on the refrigeration unit outlet 140, proximate or on the refrigerant heat absorption heat exchanger 38, proximate or on the refrigerant heat rejection heat exchanger 34, proximate or on the refrigerant compression device 32, proximate or on the electric motor 26, proximate or on the energy storage device 510, proximate or on the fuel cell 400, proximate or on the fuel tank 410, or any other conceivable location that may require sensing. Each sensor 320 is configured to detect operational data 380 and transmit the operational data 380. Operational data 380 may include temperature, pressure, speed, operational parameters of the component that the sensor 320 is attached to, operational inputs from an operator, humidity, voltage, current, charge level, flow, solar radiation, VOC levels, refrigerant or gas leaks, vibration, door opening status, occupancy/cargo load levels, location and altitude (via GPS), or any other similar parameter known to one of skill in the art. Some of the sensors 320 may be located in the vehicle 102 and may be in local communication with the controller 600.

The controller 600 is configured to communicate with the computer application 850 and the cloud-based controller 740. The controller 600 may be configured to communicate with the computer application 850 through the cloud-based controller 740. The controller 600 includes a communication device 636 to enable this communication. The communication device 636 may be capable of wireless communication including but not limited to Wi-Fi, Bluetooth, Zigbee, Sub-GHz RF Channel, cellular, satellite, or any other wireless signal known to one of skill in the art. The communication device 636 may be configured to communicate with the cloud-based controller 740 through the internet 306 using the communication device 636. The communication device 636 may be connected to the internet 306 through a Wi-Fi router or a building management system at a terminal or delivery stop. Alternatively, or additionally, the communication device 636 may be configured to communicate directly with the cloud-based controller 740.

The cloud-based controller 740 may be a remote computer server that includes a processor 342 and an associated memory 344 comprising computer-executable instructions (i.e., computer program product) that, when executed by the processor 342, cause the processor 342 to perform various operations. The processor 342 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 344 may be but is not limited to a random access memory (RAM), read only memory (ROM), or other electronic, optical, magnetic or any other computer readable medium.

The cloud-based controller 740 also includes a communication device 346. The communication device 346 may be capable of communication with the internet 306. The communication device 346 may be configured to communicate with the computing device 800 through the internet 306. The communication device 346 may be a software module that handles communications to and from the computer application 850 or to and from the controller 600.

The computing device 800 may belong to or be in possession of an individual 404. The individual 404 may be a driver of the vehicle 102, a mechanic or technician maintaining the transport refrigeration unit 22, a worker loading or unloading the refrigerated cargo space 119, a manager responsible for monitoring the transport refrigeration unit 22, or any other individual that may be responsible for the transport refrigeration unit 22.

The computing device 800 may be a desktop computer, a stationary device (e.g., control panel), a laptop computer, or a mobile computing device that is typically carried by a person, such as, for example a phone, a smart phone, smart glasses, a PDA, a smart watch, a tablet, a laptop, a fixed computing module on the refrigeration unit 22 or in the vehicle 102, or any other mobile computing device known to one of skill in the art.

The computing device 800 includes a controller 810 configured to control operations of the computing device 800. The controller 810 may be an electronic controller including a processor 830 and an associated memory 820 comprising computer-executable instructions (i.e., computer program product) that, when executed by the processor 830, cause the processor 830 to perform various operations. The processor 830 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 820 may be but is not limited to a random access memory (RAM), read only memory (ROM), or other electronic, optical, magnetic or any other computer readable medium.

It is understood that the computer application 850 may be a mobile application installed on the computing device 800. The computer application 850 may be accessible from computing device 800, such as, for example, a software-as-as service or a website. The computer application 850 may be in communication with the cloud-based controller 740 via the internet 306.

The computing device 800 includes a communication device 840 configured to communicate with the internet 306 through one or more wireless signals. The one or more wireless signals may include Wi-Fi, Bluetooth, Zigbee, Sub-GHz RF Channel, cellular, satellite, or any other wireless signal known to one of skill in the art. Alternatively, the computing device 800 may be connected to the internet 306 through a hardwired connection. The computing device 800 is configured to communicate with the cloud-based controller 740 through the internet 306.

The computing device 800 may include a display device 880, such as for example a computer display, an LCD display, an LED display, an OLED display, a touchscreen of a smart phone, tablet, or any other similar display device known to one of the skill in the art. The individual 404 operating the computing device 800 is able to view the computer application 850 through the display device 880. If the computing device 800 is a pair of smart glasses, then the display device 880 may be a transparent lens of the pair of smart glasses.

The computing device 800 includes an input device 870 configured to receive a manual input from a user (e.g., human being) of computing device 800. The input device 870 may be a keyboard, a touch screen, a joystick, a knob, a touchpad, one or more physical buttons, a microphone configured to receive a voice command, a camera or sensor configured to receive a gesture command, an inertial measurement unit configured to detect a shake of the computing device 800, or any similar input device known to one of skill in the art. The user operating the computing device 800 is able to enter data into the computer application 850 through the input device 870. The input device 870 allows the user operating the computing device 800 to data into the computer application 850 via a manual input to input device 870. For example, the user may respond to a prompt on the display device 880 by entering a manual input via the input device 870. In one example, the manual input may be a touch on the touchscreen. In an embodiment, the display device 880 and the input device 870 may be combined into a single device, such as, for example, a touchscreen on a smart phone.

The computing device 800 device may also include a feedback device 860. The feedback device 860 may activate in response to a manual input via the input device 870. The feedback device 860 may be a haptic feedback vibration device and/or a speaker emitting a sound. The feedback device 860 may activate to confirm that the manual input entered via the input device 870 was received via the computer application 850. For example, the feedback device 860 may activate by emitting an audible sound or vibrate the computing device 800 to confirm that the manual input entered via the input device 870 was received via the computer application 850.

The computing device 800 may also include a location determination device 890 that may be configured to determine a location of the computing device 800 using cellular signal triangulation, a global position satellite (GPS), or any location termination method known to one of skill in the art.

An analytics module 348 may be stored on the memory 344 of the cloud-based controller 740 and/or the controller 600. In another embodiment, the analytics module 348 may be distributed amongst multiple cloud-based controllers (rather than the single cloud-based controller 740 that is illustrated in FIG. 2) and/or the controller 600. In another embodiment, the analytics module 348 may be located locally on the memory 643 of the controller 600.

The analytics module 348 may be a software algorithm capable of performing artificial intelligence and/or machining learning functions to analyze the operational data 380 from the transport refrigeration unit 22 and external data 384 from the internet 306 to determine recommended adjustment command 382.

As aforementioned the operational data 380 may be detected by the sensors 320. The operational data 380 may be data relating to the operation and/or performance of the transport refrigeration unit 22 and/or power supply system 300. The operational data 380 may include an operating temperature, an operating pressure, and an operating speed of any component of the transport refrigeration unit 22 or the power supply system 300. Specific examples of operational data 380 may include, a temperature of the perishable goods 118, a temperature of return air 134 flowing through the return air intake 136, a temperature of conditioned air 138 flowing through the refrigeration unit outlet 140, a temperature of the refrigerant heat absorption heat exchanger 38, a temperature the refrigerant heat rejection heat exchanger 34, a pressure of the refrigerant compression device 32, a speed of the refrigerant compression device 32, a speed of the electric motor 26, a temperature of the electric motor 26, a state of charge of the energy storage device 510, a temperature of the energy storage device 510, an energy output of the fuel cell 400, a temperature of the fuel cell 400, a pressure of the fuel tank 410, a fuel level of the fuel tank 410, a Global Positioning Satellite (GPS) location of the transport container 106, or any other conceivable data parameter. Advantageously, the GPS location may be useful to determine where the transport container is located in its present route.

The external data 384 may be obtained from the internet 306 and/or other remote databases. The external data 384 may include, but is not limited to, delivery schedules, predicted delays due to traffic or weather, predicted weather, predicted weather that may affect anticipated solar gain, temperature, or humidity conditions, en route changes due to cancellations, typical operational patterns (e.g., breaks, refueling), locations of fuel stations on a present route (and their status-open/closed pricing) or recommended revised routing. The external data 384 may also relate to the condition of a digital twin, which may indicate problems with the vehicle 102, the refrigeration system 200, or the status of the perishable goods 118 (e.g., it may predict that the thermal conditions maintained have caused, or will cause the condition of the cargo (118) to degrade).

The analytics module 348 is configured to determine a recommended adjustment command 382 based on the external data 384 and/or the operational data 380. The recommended adjustment command 382 is configured to adjust a performance of the transport refrigeration unit 22 and/or the power supply system 300.

In one example, the analytics module 348 generates a recommended adjustment command 382 that increases cooling to the transport container 106 in advance of transport refrigeration system 200 reaching hotter weather, experiencing lengthy traffic, or stopping where the doors 117 may be opened for extended period of time. Advantageously, this recommended adjustment command 382 may help alleviate strain on the transport refrigeration unit 22, or protect/improve the condition of the goods (118), when it experiences these conditions. In another example, the analytics module 348 generates a recommended adjustment command 382 that commands the thermal storage system 516 to generate ice to keep the transport container 106 cool in advance of transport refrigeration system 200 reaching hotter weather, experiencing lengthy traffic, or stopping where the doors 117 may be opened for extended period of time. Advantageously, this recommended adjustment command 382 may help alleviate strain on the transport refrigeration unit 22 when it experiences these conditions.

In another example, the analytics module 348 generates a recommended adjustment command 382 that increases cooling to the transport container 106 or commands the thermal storage system 516 to generate ice to keep the transport container 106 cool in order to drain the energy storage device 510 in advance of the transport refrigeration system 200 approaching a hill where the generator 388 may be able to generate energy from the hub or axle due to the downhill descent, a braking area where the generator 388 may be able to generate energy from the hub or axle due to the slowing of the vehicle 102, or a charging station 386 where the energy storage device 510 may be recharged. Advantageously, this recommended adjustment command 382 may help dump energy into cooling or ice creation when other energy sources will be immediately available to recharge the energy storage device 510, thus allowing the overall system to operate for longer periods of time.

In another example, the analytics module 348 generates a recommended adjustment command 382 that increases electricity generation by the fuel cell 400 to increase cooling to the transport container 106 or generate ice using the thermal storage system 516 to keep the transport container 106 cool in order to drain the fuel tank 410 advance of the transport refrigeration system 200 approaching a fuel station 389 where the fuel tank 410 may be refilled. Advantageously, this recommended adjustment command 382 may help empty the fuel tank 410 by dumping energy into cooling or ice creation when other fuel sources will be immediately available to refill the fuel tank 410, thus allowing the overall system to operate for longer periods of time.

The analytics module 348 may also be configured to temporarily reduce the nominal cargo temperature setpoint in times of limited power/capacity. At a minimum the analytics module 348 may also be configured to operate the transport refrigeration unit 22 at the lower limits of acceptable temperature (analogous to setting your home thermostat a little higher or lower than preferred to save energy). In severe limiting conditions it may be advisable to violate the desired temperature conditions.

The recommended adjustment command 382 may be transmitted to the controller 600 and the controller 600 may automatically adjust operation of the transport refrigeration unit 22 and/or the power supply system 300 based on the recommended adjustment command 382. Alternatively, the controller 600 may relay the recommended adjustment command 382 to the power supply system 300 and the power supply system 300 may automatically adjust operation of the power supply system 300 based on the recommended adjustment command 382.

Alternatively, the recommended adjustment command 382 may be transmitted to the computing device 800 and the individual 404 may manually adjust operation of the transport refrigeration unit 22 and/or the power supply system 300 based on the recommended adjustment command 382.

The analytics module 348 may continuously learn from each route taken and update the underlying algorithms to provide for better performance and optimization of the transport refrigeration unit 22 and the power supply system 300 on future routes. This learned data from each route may be shared across multiple different transport refrigeration units 22 in a fleet of transport refrigeration units 22 to better optimize the data learned from each route, which would lead to better performance of each transport refrigeration unit 22 in the fleet.

Figure 3:
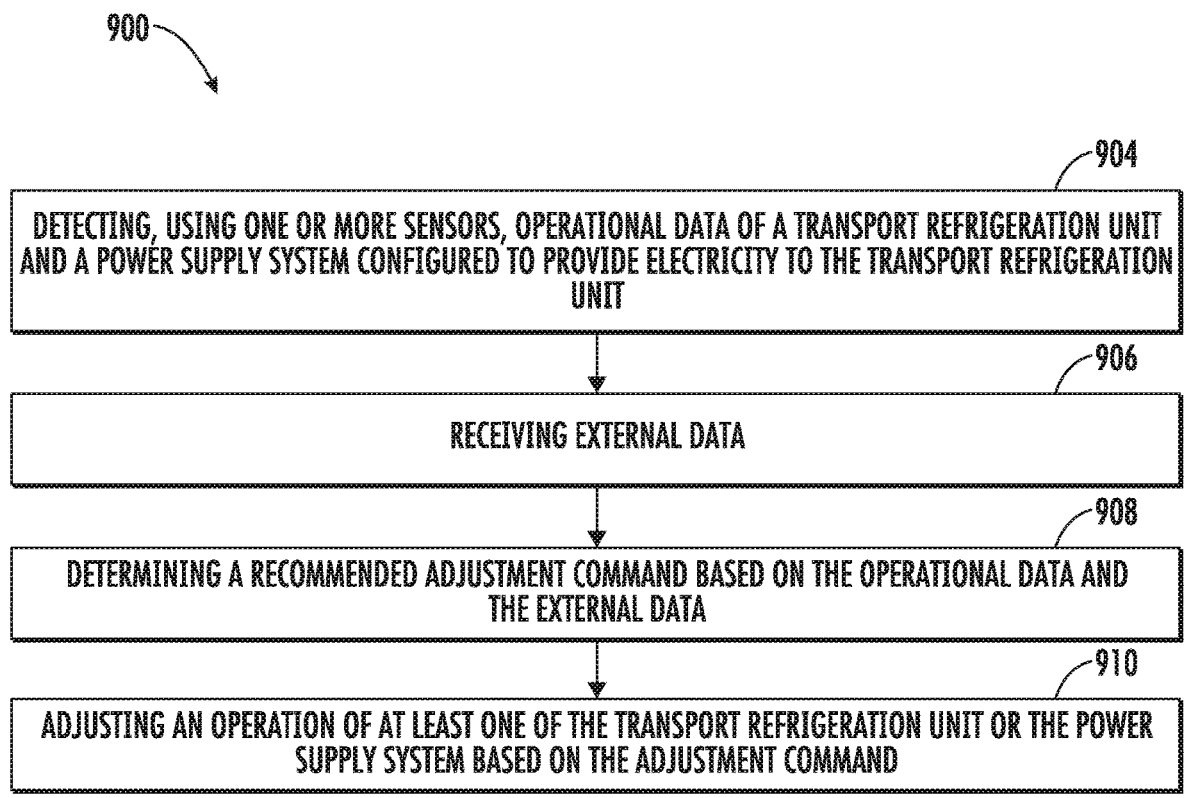
FIG. 3 is a flow process illustrating an exemplary method of operating the transport refrigeration system of FIGS. 1 and 2, according to an embodiment of the present disclosure.

Referring now to FIG. 3, with continued reference to FIGS. 1 and 2. A flow process of a method 900 of operating a transport refrigeration system 20 is illustrated, according to an embodiment of the present disclosure. In an embodiment, the method 900 may be performed by the analytics module 348.

At block 904, one or more sensors 320 are used to detect operational data 380 of a transport refrigeration unit 22 and a power supply system 300 configured to provide electricity to the transport refrigeration unit 22. At block 906, external data 384. The external data 384 may be data about at least one of a route of the transport refrigeration unit 22 and the power supply system 300, a current condition of the vehicle 102, the refrigeration unit 22, or a perishable good 118, or a predicted condition of the vehicle 102, the refrigeration unit 22, or the perishable good 118 is received. At block 908, a recommended adjustment command 382 is determined based on the operational data 380 and the external data 384. The recommended adjustment command may be determined using at least one of artificial intelligence or machine learning.

Machine learning and/or artificial intelligence may be applied in real time to the operational data 380 and the external data 384 including historical fleet data and contemporaneous fleet data to determine recommended adjustment commands 382 that optimize operation of the transport refrigeration system 200. The external data 384 may include historical fleet data and contemporaneous fleet data of similar transport refrigeration systems.

At block 910, an operation of at least one of the transport refrigeration unit 22 or the power supply system 300 is adjusted based on the recommended adjustment command 382. The operation may be automatically adjusted based on the recommended adjustment command 382 by at least one of a controller 600 of the transport refrigeration unit 22 or a power management module 310 of the power supply system 300. Alternatively, the recommended adjustment command 382 may be transmitted to a computing device 800 of an individual 404 and the individual 404 adjusts the operation based on the recommended adjustment command 382.

In one embodiment, the power supply system 300 includes at least a fuel cell 400, the external data 384 includes at least a location of a fuel station 389 on a present route, and then the recommended adjustment command 382 may call for increasing fuel consumption by the fuel cell 400, electricity generation by the fuel cell 400, and electricity consumption by the transport refrigeration unit 22 from the fuel cell 400 to increase cooling of a transport container 106 by the transport refrigeration unit 22 generating conditioned air 138 prior to the location of the fuel station 389 on the present route.

In another embodiment, the power supply system 300 includes at least an energy storage device 510, the external data 384 includes at least a location of a charging station 386 on a present route, and then the recommended adjustment command 382 may call for increasing electricity consumption by the transport refrigeration unit 22 from the energy storage device 510 to increase cooling of a transport container 106 by the transport refrigeration unit 22 generating conditioned air 138 prior to the location of the charging station 386 on the present route.

In another embodiment, the power supply system 300 includes at least an energy storage device 510 and an axle generator or a hub generator, the external data 384 includes at least a location of a downhill descent on a present route, and then the recommended adjustment command 382 may call for increasing electricity consumption by the transport refrigeration unit 22 from the energy storage device 510 to increase cooling of a transport container 106 by the transport refrigeration unit 22 generating conditioned air 138 prior to the location of the downhill descent on the present route.

In another embodiment, the power supply system 300 includes at least an energy storage device 510 and an axle generator or a hub generator, the external data 384 includes at least a location of a braking area on a present route, and then the recommended adjustment command 382 may call for increasing electricity consumption by the transport refrigeration unit 22 from the energy storage device 510 to increase cooling of a transport container 106 by the transport refrigeration unit 22 generating conditioned air 138 prior to the location of the braking area on the present route.

In another embodiment, the power supply system 300 is a fuel cell 400, the external data 384 includes at least a location of a fuel station 389 on a present route, and then the recommended adjustment command 382 may call for increasing fuel consumption by the fuel cell 400, electricity generation by the fuel cell 400, and electricity consumption by a thermal storage system 516 from the fuel cell 400 to increase cooling of a transport container 106 by charging the thermal storage system 516 prior to the location of the fuel station 389 on the present route.

In another embodiment, the power supply system 300 includes at least an energy storage device 510, the external data 384 includes at least a location of a charging station 386 on a present route, and then the recommended adjustment command 382 may call for increasing electricity consumption by a thermal storage system 516 from the energy storage device 510 to increase cooling of a transport container 106 by charging the thermal storage system 516 prior to the location of the charging station 386 on the present route.

In another embodiment, the power supply system 300 includes at least an energy storage device 510, the external data 384 includes at least a location of a charging station 386 on a present route, and then the recommended adjustment command 382 may call for increasing electricity consumption by a transport refrigeration unit 22 from the energy storage device 510 to increase cooling of a transport container 106 by the transport refrigeration unit generating conditioned air prior to the location of the charging station 386 on the present route.

In another embodiment, the power supply system 300 includes at least an energy storage device 510 and an axle generator or a hub generator, the external data 384 includes at least a location of a downhill descent on a present route, and then the recommended adjustment command 382 may call for increasing electricity consumption by a thermal storage system 516 from the energy storage device 510 to increase cooling of a transport container 106 by charging the thermal storage system 516 prior to the location of the downhill descent on the present route.

In another embodiment, the power supply system 300 includes at least an energy storage device 510 and an axle generator or a hub generator, the external data 384 includes at least a location of a braking area on a present route, and then the recommended adjustment command 382 may call for increasing electricity consumption by a thermal storage system 516 from the energy storage device 510 to increase cooling of a transport container 106 by charging the thermal storage system 516 prior to the location of the braking area on the present route.

In another embodiment, the external data 384 includes at least a location on a present route where a door will be opened to a transport container 106 operably connected to the transport refrigeration unit 22, and then the recommended adjustment command 382 may call for increasing electricity consumption by the transport refrigeration unit 22 from the power supply system to increase cooling of a transport container 106 by the transport refrigeration unit 22 generating conditioned air 138 prior to the location on the present route where the door will be opened to the transport container 106.

In another embodiment, the external data 384 includes at least a future weather event on a present route that will be experienced by the transport refrigeration unit 22, and then the recommended adjustment command 382 may call for increasing electricity consumption by the transport refrigeration unit 22 from the power supply system to increase cooling of a transport container 106 by the transport refrigeration unit 22 generating conditioned air 138 prior to the future weather event on the present route. The future weather event may be an increase in temperature or solar gain experienced by the transport container 106.

In another embodiment, the external data 384 includes at least a future weather event on a present route that will be experienced by the transport refrigeration unit 22, and then the recommended adjustment command 382 may call for decreasing electricity consumption by the transport refrigeration unit 22 from the power supply system to decrease cooling of a transport container 106 by the transport refrigeration unit 22 generating less conditioned air 138 prior to the future weather event on the present route. The future weather event may be a decrease in temperature or solar gain experienced by the transport container 106.

In another embodiment, the external data 384 includes at least a future weather event on a present route that will be experienced by the transport refrigeration unit 22, and then the recommended adjustment command 382 may call for increasing electricity consumption by the transport refrigeration unit 22 from the power supply system to increase heating of a transport container 106 by the transport refrigeration unit 22 hotter conditioned air 138 prior to the future weather event on the present route. The future weather event may be a decrease in temperature or solar gain experienced by the transport container 106.

In another embodiment, the external data 384 includes at least a location on a present route where a door will be opened to a transport container 106 operably connected to the transport refrigeration unit 22, and then the recommended adjustment command 382 may call for increasing electricity consumption by a thermal storage system 516 from the power supply system to increase cooling of the transport container 106 by charging the thermal storage system 516 prior to the location on the present route where the door will be opened to the transport container 106.

In another embodiment, the external data 384 includes at least a future weather event on a present route that will be experienced by the transport refrigeration unit 22, and then the recommended adjustment command 382 may call for increasing electricity consumption by a thermal storage system 516 from the power supply system to increase cooling of the transport container 106 by charging the thermal storage system 516 prior to the future weather event on the present route. The future weather event may be an increase in temperature or solar gain experienced by the transport container 106.

Further, in the event the refrigerated cargo space 119 is subdivided into sub-spaces, each separately temperature controlled, then the aforementioned control examples could be applied individually to the separate compartments and that preference could be given one compartment over another.

The method 900 may further include rerouting the transportation refrigeration unit 22 based on the at least one of the operational data 380 and the external data 384. The analytics module 348 may make control decisions based on the actual conditions of the perishable goods 118 (e.g., operational data 380) and predicted conditions of the perishable goods 118 (e.g., external data 384). The operational data 380 may include the actual conditions of the perishable goods 118 and the external data 384 may include the predicted conditions of the perishable goods 118. The control decisions may include intelligent rerouting that could maximize the value of the perishable goods 118). For example, ice cream may be dropped off at a store earlier in the route than originally planned because it is going to melt. This may have been caused by weather, traffic, equipment problems, other issues, or any combination thereof.

While the above description has described the flow process of FIG. 3, in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code (e.g., computer program product) containing instructions embodied in tangible media (e.g., non-transitory computer readable medium), such as floppy diskettes, CD ROMs, hard drives, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes a device for practicing the exemplary embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of +8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of operating a transport refrigeration system, the method comprising:
   detecting, using one or more sensors, operational data of a transport refrigeration unit and a power supply system configured to provide electricity to the transport refrigeration unit;
   receiving external data;
   determining a recommended adjustment command based on the operational data and the external data; and
   adjusting an operation of at least one of the transport refrigeration unit or the power supply system based on the recommended adjustment command;
   wherein the power supply system comprises a fuel cell, wherein the external data comprises a location of a fuel station on a present route, and wherein adjusting operation of at least one of the transport refrigeration unit or the power supply system based on the recommended adjustment command further comprises:
   increasing fuel consumption by the fuel cell, electricity generation by the fuel cell, and electricity consumption by the transport refrigeration unit from the fuel cell to increase cooling of a transport container by the transport refrigeration unit generating conditioned air prior to the location of the fuel station on the present route.

2. The method of claim 1, wherein the operation is automatically adjusted based on the recommended adjustment command by at least one of a controller of the transport refrigeration unit or a power management module of the power supply system.

3. The method of claim 1, further comprising:
   transmitting the recommended adjustment command to a computing device of an individual, wherein the individual can adjust the operation based on the recommended adjustment command.

4. The method of claim 1, wherein the power supply system comprises an energy storage device, wherein the external data comprises a location of a charging station on a present route, and wherein adjusting operation of at least one of the transport refrigeration unit or the power supply system based on the recommended adjustment command further comprises:
   adjusting electricity consumption by the transport refrigeration unit from the energy storage device to adjust cooling of a transport container by the transport refrigeration unit air generating conditioned air prior to the location of the charging station on the present route.

5. The method of claim 1, wherein the power supply system comprises an energy storage device and an axle generator or a hub generator, wherein the external data comprises a location of a downhill descent on a present route, and wherein adjusting operation of at least one of the transport refrigeration unit or the power supply system based on the recommended adjustment command further comprises:
   increasing electricity consumption by the transport refrigeration unit from the energy storage device to increase cooling of a transport container by the transport refrigeration unit generating conditioned air prior to the location of the downhill descent on the present route.

6. The method of claim 1, wherein the power supply system comprises an energy storage device and an axle generator or a hub generator, wherein the external data comprises a location of a braking area on a present route, and wherein adjusting operation of at least one of the transport refrigeration unit or the power supply system based on the recommended adjustment command further comprises:
   increasing electricity consumption by the transport refrigeration unit from the energy storage device to increase cooling of a transport container by the transport refrigeration unit generating conditioned air prior to the location of the braking area on the present route.

7. The method of claim 1, wherein the power supply system comprises an energy storage device, wherein the external data comprises a location of a charging station on a present route, and wherein adjusting operation of at least one of the transport refrigeration unit or the power supply system based on the recommended adjustment command further comprises:
   increasing electricity consumption by a thermal storage system from the energy storage device to increase cooling of a transport container by charging the thermal storage system prior to the location of the charging station on the present route.

8. The method of claim 1, wherein the power supply system comprises an energy storage device and an axle generator or a hub generator, wherein the external data comprises a location of a downhill descent on a present route, and wherein adjusting operation of at least one of the transport refrigeration unit or the power supply system based on the recommended adjustment command further comprises:
   increasing electricity consumption by a thermal storage system from the energy storage device to increase cooling of a transport container by charging the thermal storage system prior to the location of the downhill descent on the present route.

9. The method of claim 1, wherein the power supply system comprises an energy storage device and an axle generator or a hub generator, wherein the external data comprises a location of a braking area on a present route, and wherein adjusting operation of at least one of the transport refrigeration unit or the power supply system based on the recommended adjustment command further comprises:
   increasing electricity consumption by a thermal storage system from the energy storage device to increase cooling of a transport container by charging the thermal storage system prior to the location of the braking area on the present route.

10. The method of claim 1, wherein the external data comprises a location on a present route where a door will be opened to a transport container operably connected to the transport refrigeration unit, and wherein adjusting operation of at least one of the transport refrigeration unit or the power supply system based on the recommended adjustment command further comprises:
    increasing electricity consumption by the transport refrigeration unit from the power supply system to increase cooling of a transport container by the transport refrigeration unit generating conditioned air prior to the location on the present route where the door will be opened to the transport container.

11. The method of claim 1, wherein the external data comprises a future weather event on a present route that will be experienced by the transport refrigeration unit, and wherein adjusting operation of at least one of the transport refrigeration unit or the power supply system based on the recommended adjustment command further comprises:

adjusting electricity consumption by the transport refrigeration unit from the power supply system to adjusting cooling of a transport container by the transport refrigeration unit generating conditioned air prior to the future weather event on the present route.

12. The method of claim 1, wherein the external data comprises a location on a present route where a door will be opened to a transport container operably connected to the transport refrigeration unit, and wherein adjusting operation of at least one of the transport refrigeration unit or the power supply system based on the recommended adjustment command further comprises:

increasing electricity consumption by a thermal storage system from the power supply system to increase cooling of the transport container the thermal storage system generating ice prior to the location on the present route where the door will be opened to the transport container.

13. The method of claim 1, wherein the external data comprises a future weather event on a present route that will be experienced by the transport refrigeration unit, and wherein adjusting operation of at least one of the transport refrigeration unit or the power supply system based on the recommended adjustment command further comprises:

increasing electricity consumption by a thermal storage system from the power supply system to increase cooling of the transport container by charging the thermal storage system prior to the future weather event on the present route.

14. The method of claim 1, wherein the recommended adjustment command is determined using at least one of artificial intelligence or machine learning.

15. The method of claim 1, wherein the external data is data about at least one of: a route of the transport refrigeration unit and the power supply system; a current condition of a vehicle, the refrigeration unit, or a perishable good; or a predicted condition of the vehicle, the refrigeration unit, or the perishable good.

16. The method of claim 1, further comprising:

rerouting the transportation refrigeration unit based on the at least one of the operational data and the external data.

17. A method of operating a transport refrigeration system, the method comprising:

detecting, using one or more sensors, operational data of a transport refrigeration unit and a power supply system configured to provide electricity to the transport refrigeration unit;

receiving external data;

determining a recommended adjustment command based on the operational data and the external data; and adjusting an operation of at least one of the transport refrigeration unit or the power supply system based on the recommended adjustment command;

wherein the power supply system comprises a fuel cell, wherein the external data comprises a location of a fuel station on a present route, and wherein adjusting operation of at least one of the transport refrigeration unit or the power supply system based on the recommended adjustment command further comprises:

increasing fuel consumption by the fuel cell, electricity generation by the fuel cell, and electricity consumption by a thermal storage system from the fuel cell to increase cooling of a transport container by charging the thermal storage system prior to the location of the fuel station on the present route.

18. A transport refrigeration system comprising:

a transport refrigeration unit configured to provide conditioned air to a refrigerated cargo space of a transport container;

a power supply system configured to provide electricity to the transport refrigeration unit;

one or more sensors configured to detect operational data of the transport refrigeration unit and the power supply system; and an analytics module configured to receive external data and determine a recommended adjustment command based on the operational data and the external data, wherein an operation of at least one of the transport refrigeration unit or the power supply system is adjusted based on the recommended adjustment command;

wherein the power supply system comprises a fuel cell, wherein the external data comprises a location of a fuel station on a present route, and wherein adjusting operation of at least one of the transport refrigeration unit or the power supply system based on the recommended adjustment command further comprises:

increasing fuel consumption by the fuel cell, electricity generation by the fuel cell, and electricity consumption by the transport refrigeration unit from the fuel cell to increase cooling of a transport container by the transport refrigeration unit generating conditioned air prior to the location of the fuel station on the present route.

19. A computer program product tangibly embodied on a non-transitory computer readable medium, the computer program product including instructions that, when executed by a processor, cause the processor to perform operations comprising:

detecting, using one or more sensors, operational data of a transport refrigeration unit and a power supply system configured to provide electricity to the transport refrigeration unit;

receiving external data;

determining a recommended adjustment command based on the operational data and the external data; and adjusting an operation of at least one of the transport refrigeration unit or the power supply system based on the recommended adjustment command;

wherein the power supply system comprises a fuel cell, wherein the external data comprises a location of a fuel station on a present route, and wherein adjusting operation of at least one of the transport refrigeration unit or the power supply system based on the recommended adjustment command further comprises:

increasing fuel consumption by the fuel cell, electricity generation by the fuel cell, and electricity consumption by the transport refrigeration unit from the fuel cell to increase cooling of a transport container by the transport refrigeration unit generating conditioned air prior to the location of the fuel station on the present route.

* * * * *